US012706370B2

(12) United States Patent
Weakley et al.

(10) Patent No.: US 12,706,370 B2
(45) Date of Patent: Aug. 11, 2026

(54) RFID ANTENNA FOR REJECTING UNWANTED RF SIGNALS

(71) Applicant: CHECKPOINT SYSTEMS, INC., Thorofare, NJ (US)

(72) Inventors: Thomas Weakley, Simpsonville, SC (US); Morui Li, Cherry Hill, NJ (US)

(73) Assignee: CHECKPOINT SYSTEMS, INC., Thorofare, NJ (US)

( * ) Notice: Subject to any disclaimer, the term of this patent is extended or adjusted under 35 U.S.C. 154(b) by 0 days.

(21) Appl. No.: 18/871,136

(22) PCT Filed: Jun. 2, 2023

(86) PCT No.: PCT/US2023/024379
§ 371 (c)(1),
(2) Date: Dec. 2, 2024

(87) PCT Pub. No.: WO2023/235617
PCT Pub. Date: Dec. 7, 2023

(65) Prior Publication Data

US 2025/0343345 A1 Nov. 6, 2025

Related U.S. Application Data

(60) Provisional application No. 63/348,616, filed on Jun. 3, 2022.

(51) Int. Cl.

| | |
|---|---|
| ***H01Q 1/22*** | (2006.01) |
| ***G06K 19/077*** | (2006.01) |
| ***H01Q 9/16*** | (2006.01) |

(52) U.S. Cl.
CPC ..... *H01Q 1/2208* (2013.01); *G06K 19/07786* (2013.01); *H01Q 9/16* (2013.01)

(58) Field of Classification Search
CPC ... H01Q 1/2208; H01Q 9/16; G06K 19/07786
USPC .......................................................... 235/492
See application file for complete search history.

(56) References Cited

U.S. PATENT DOCUMENTS

| | | | |
|---|---|---|---|
| 2002/0022836 A1* | 2/2002 | Goble ................ | A61B 18/1206 606/41 |
| 2005/0024287 A1 | 2/2005 | Jo et al. | |
| 2015/0154488 A1 | 6/2015 | Heo et al. | |
| 2018/0277957 A1* | 9/2018 | Geist ........................ | H04B 5/26 |

(Continued)

FOREIGN PATENT DOCUMENTS

| | | |
|---|---|---|
| CN | 109993266 A | 7/2019 |

OTHER PUBLICATIONS

Patent Cooperation Treaty (PCT), International Search Report and Written Opinion for Application PCT/US2023/024379 filed on Jun. 2, 2023, mailed Sep. 22, 2023, International Searching Authority, KR.

*Primary Examiner* — Michael G Lee
*Assistant Examiner* — David Tardif
(74) *Attorney, Agent, or Firm* — McDonald Hopkins LLC

(57) ABSTRACT

A RFID label is shown and described herein. The RFID label includes a RFID antenna configured to provide attenuation of unwanted signals at relatively high frequencies, e.g., above 2 GHz and in the range of about 2 to about 5 GHz. The RFID label comprises a dipole antenna having tuning elements that attenuate or reject signals at high frequencies such as, for example, those frequencies at which microwave ovens operate.

20 Claims, 5 Drawing Sheets

(56) References Cited

U.S. PATENT DOCUMENTS

| | | | | |
|---|---|---|---|---|
| 2019/0260108 | A1* | 8/2019 | Davis | H01Q 1/243 |
| 2020/0373674 | A1 | 11/2020 | Escaro et al. | |
| 2020/0396828 | A1* | 12/2020 | Omuro | H05K 1/0243 |
| 2024/0078407 | A1* | 3/2024 | Liu | G06K 19/0779 |

* cited by examiner

RFID ANTENNA FOR REJECTING UNWANTED RF SIGNALS

CROSS-REFERENCE TO RELATED APPLICATION

This application is a 35 U.S.C. § 371 national stage application of PCT Application No. PCT/US2023/024379 filed on Jun. 2, 2023 titled "RFID ANTENNA FOR REJECTING UNWANTED RF SIGNALS" which claims priority to U.S. Patent Application No. 63/348,616, filed on Jun. 3, 2022, entitled "RFID ANTENNA FOR REJECTING UNWANTED RF SIGNALS", each of which are incorporated herein by reference in their entireties.

FIELD OF INVENTION

The present invention relates to an RFID antenna suitable for use in applications where the label will be exposed to power outputs that that exceed the maximum input power of a conventional RFID label. The RFID antenna is configured to reject out-of-band signals. The present invention also relates to the labels and packaging comprising such RFID antenna and use of the same.

BACKGROUND

RFID labels are used to label a wide array of consumer products to provide a way of tracking items. The food industry and food products are sectors where the use of RFID labels is growing and for which demand will continue to increase. RFID technology can be used to label and track products with expiration dates such as, but not limited to, meats, dairy products, fruits, vegetables, and other such produce. RFID technology can be employed in a system for identifying items that are close to their expiration date. Stores can take that information and, if desired, reduce the price of items to entice customers to buy the products before the expiration date. Products whose expiration date has expired can be quickly located and removed from the sales floor.

In the case of some food products, e.g., frozen or some refrigerated products, the product may be provided such that it is to be heated in a microwave prior to consumption. In many instances the RFID technology is embedded or applied to the packaging in a manner that it is not or may not be removed prior to being exposed to the microwave operating conditions.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

In one aspect, provided is a RFID label comprising a RFID antenna that attenuates incoming power signals at frequencies above 2.4 GHz. In one embodiment, the RFID label includes a RFID antenna configured as a dipole antenna comprising a loop segment and antenna segments extending from the loop segment, where the antenna segments comprise a tuning element coupled to the antenna segment. The tuning element provide attenuation of incoming signals at frequencies above 2.4 GHz.

In another aspect of the invention, a dipole antenna for a radio frequency identification label is provided having a loop region, a first dipole element in electrical connection with the loop region and terminating at a first pad, and a second dipole element in electrical connection with the loop region and terminating at a second pad. The first and second dipole elements extending in opposite directions from each other another along a horizontal axis of the dipole antenna. At least one tuning element, wherein the at least one tuning element extends from one or both of said first and second dipole elements, a shape, a size, and a location of each of the at least one tuning elements being selected to obtain a desired level of attenuation of signal within a predetermined frequency band, wherein the dipole antenna is tuned using the at least one tuning element to operate in a predetermined operating frequency range.

In some embodiments, the desired level of attenuation of signal is at least 27 dB. In other embodiments, the desired level of attenuation of signal is at least 35 dB. In further embodiments, the predetermined frequency band is greater than 2 GHz, is between 2.4-4.0 GHz, or is between 2-14.5 GHz. In further embodiments, the at least one tuning element provides 0 dB to about 40 dB, about 5 dB to about 35 dB, about 10 dB to about 30 db, or about 15 dB to about 25 dB of desired level of attenuation for the predetermined frequency band of between about 2.4 to about 4.0 GHz. In additional embodiments, the at least one tuning element provides from about 35 dB to about 40 dB of desired attenuation for the predetermined frequency band of between about 2.4 to about 4.0 GHz.

In further embodiments, the shape of the at least one tuning elements can a triangle, rectangle, circle, ellipse, trapezoid, pentagon, hexagon, "L", trace, or block; wherein the at least one tuning elements can all have the same shape, a different shape, or a combination of shapes.

In additional embodiments, the first and second dipole elements each have at least one tuning element of the same size at equivalent positions along the dipole elements, with each at least one tuning element extending therefrom having an "L" shape with a short leg and a long leg; the short legs of the "L" shape being electrically connected to the first and second dipole elements.

In some embodiments, the first and second dipole elements each have a meandering pattern, wherein a physical length of the first dipole element is shorter than an electrical length of the first dipole element, and a physical length of the second dipole element is shorter than an electrical length of the second dipole element.

In further embodiments, the dipole antenna further includes a circuit chip in electrical connection with the loop region using a first connection of the loop region and a second connection of the loop region, the first connection and second connection of the loop region are located at a first side of the loop region and the first and second dipole elements are electrically connected to a second side of the loop region, wherein the first side and second side of the loop region are located on opposite sides of the loop region.

In other embodiments, the first connection and second connection of the loop region are located at the first side of the loop region and the first and second dipole elements are electrically connected to the first side of the loop region, wherein the first side and second side of the loop region are located on opposite sides of the loop region.

In additional embodiments, the first connection and second connection of the loop region are located at the first side of the loop region, and the first and second dipole elements are electrically connected at a location between the first side and second side of the loop region, wherein the first side and second side of the loop region are located on opposite sides of the loop region.

In yet another aspect of the invention, a radio frequency identification (RFID) label is provided having a dipole antenna formed on a substrate. The substrate having an adhesive for attaching the label to a surface. The dipole antenna has a loop region, a first dipole element in electrical connection with the loop region and terminating at a first pad, and a second dipole element in electrical connection with the loop region and terminating at a second pad. The first and second dipole elements extending in opposite directions from each other another along a horizontal axis of the dipole antenna.

Some embodiments include at least one tuning element, wherein the at least one tuning element extends from one or both of said first and second dipole elements, a shape, a size, and a location of each of the at least one tuning elements being selected to obtain a desired level of attenuation of signal within a predetermined frequency band. The dipole antenna is tuned using the at least one tuning element to operate in a predetermined operating frequency range.

In yet another aspect of the invention an article is provided. The article includes a radio frequency identification (RFID) label attached to the article. The RFID label includes a dipole antenna formed on a substrate, the substrate having an adhesive for attaching the label to a surface. The dipole antenna has a loop region, a first dipole element in electrical connection with the loop region and terminating at a first pad, and a second dipole element in electrical connection with the loop region and terminating at a second pad. The first and second dipole elements extending in opposite directions from each other another along a horizontal axis of the dipole antenna. At least one tuning element is provided, wherein the at least one tuning element extends from one or both of said first and second dipole elements, a shape, a size, and a location of each of the at least one tuning elements being selected to obtain a desired level of attenuation of signal within a predetermined frequency band, wherein the dipole antenna is tuned using the at least one tuning element to operate in a predetermined frequency range. The desired level of attenuation is selected to prevent the RFID label from thermally damaging the article, when the RFID label is exposed to RF energy in excess of a predetermined power level within the predetermined frequency band.

In some embodiments, the predetermined power level is greater than +20 dBm and the predetermined frequency band is greater than 2 GHz. In other embodiments, the predetermined power level and the predetermined frequency band are those generated by a microwave oven.

The following description and the drawings disclose various illustrative aspects. Some improvements and novel aspects may be expressly identified, while others may be apparent from the description and drawings.

BRIEF DESCRIPTION OF THE DRAWINGS

The accompanying drawings illustrate various systems, apparatuses, devices and related methods, in which like reference characters refer to like parts throughout, and in which.

DETAILED DESCRIPTION

Figure 1A:
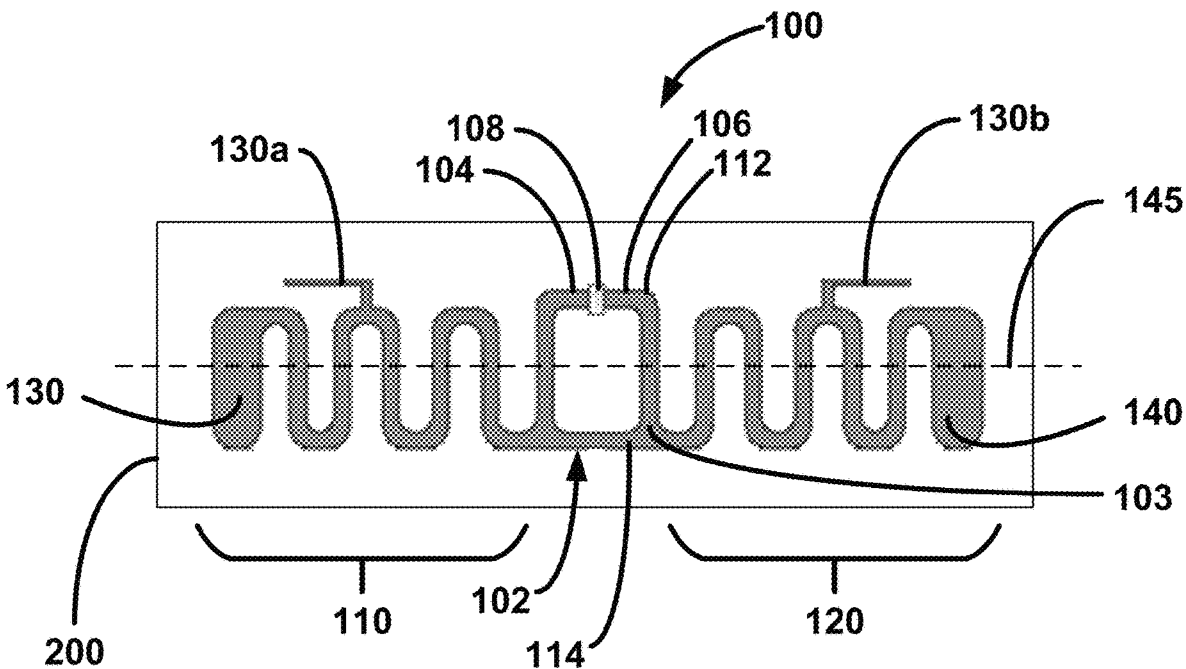
FIG. 1A is a representation of a RFID label in accordance with an embodiment of the invention.

Reference will now be made to exemplary embodiments, examples of which are illustrated in the accompanying drawings. It is to be understood that other embodiments may be utilized and structural and functional changes may be made. Moreover, features of the various embodiments may be combined or altered. As such, the following description is presented by way of illustration only and should not limit in any way the various alternatives and modifications that may be made to the illustrated embodiments. In this disclosure, numerous specific details provide a thorough understanding of the subject disclosure. It should be understood that aspects of this disclosure may be practiced with other embodiments not necessarily including all aspects described herein, etc.

As used herein, the words “example” and “exemplary” means an instance, or illustration. The words “example” or “exemplary” do not indicate a key or preferred aspect or embodiment. The word “or” is intended to be inclusive rather than exclusive, unless context suggests otherwise. As an example, the phrase “A employs B or C,” includes any inclusive permutation (e.g., A employs B; A employs C; or A employs both B and C). As another matter, the articles “a” and “an” are generally intended to mean “one or more” unless context suggest otherwise.

Provided is a RFID label that is suitable for use in an environment such as a microwave oven. A RFID tag or label may be exposed to microwave radiation during their use. For example, RFID labels might be used on food packaging (frozen or non-frozen) for use with an inventory or product tracking system. Many such products may be microwaveable products in which the RFID label is not removed prior to exposure to the microwave radiation. RFID labels may also be used in medical or laboratory settings to identify medical specimens, manufacturing products, forensic samples, or other laboratory samples that are processed with the aid of microwave energy in laboratory or production equipment. Microwave energy is supplied as electromagnetic radiation at approximately 2.45 GHz frequency or at other frequencies in the range of about 2 to 14.5 GHz in commercial or experimental laboratory or production equipment. Commercial or home-use microwave ovens provide microwave energy as 2.45 GHz frequency electromagnetic radiation to heat foods and beverages. In either case, the RFID tag or label may be exposed to approximately 2.45 GHz frequency radiation at power levels ranging from 100 to 1200 watt, for times ranging from 1 second to many hours, with either continuous or pulsed microwave exposure.

Exposing RFID tags or labels to electromagnetic radiation generated by a microwave source, such as a microwave oven, may cause the RFID tag or label to become nonfunctional. Such RFID tags will often become non-functional if they are exposed to high microwave power levels, such as microwave power in the range of 100 to 1200 watts discussed above. For example, microwave ovens typically output 1000 watts of power (+60 dBm). This is 40 dB above the maximum input power of most UHF RFID devices, which is about +20 dBm. In such cases, the electromagnetic energy in a microwave oven may cause the RFID tag or antenna elements to become very hot, possibly hot enough to burst into flame, creating a safety hazard that may be an even worse problem than the problem of a non-functional label. The RFID label may also arc to the microwave oven power supply or other electrical grounds in the oven, creating sparks and possibly damaging the power supply. In these circumstances, it is also possible that the object to which the RFID label is affixed may also be damaged.

Figure 1B:
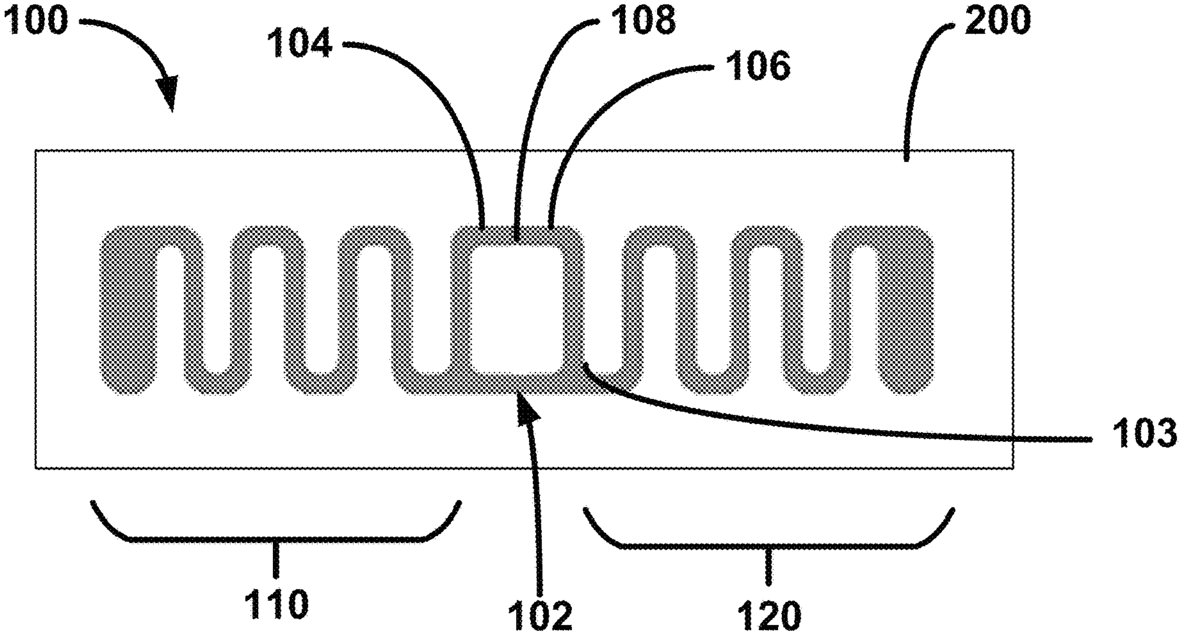
FIG. 1B is a representation of a comparative RFID label.
Figure 1C:
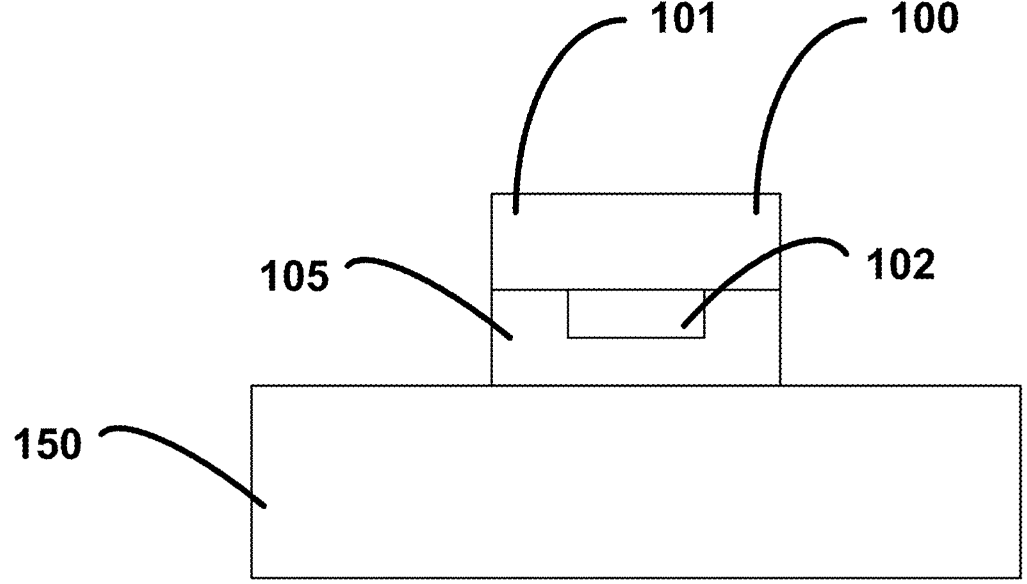
FIG. 1C is a representation of a cross section of an RFID label in accordance with an embodiment of the invention.

Turning to FIGS. 1A-C, an RFID label 100 comprises an RFID antenna 102 disposed on a substrate 101. The RFID antenna 102 is provided in the form of transmission lines on a substrate material. The transmission lines are provided as conductive traces in a pattern typically formed from a conductive metal. The pattern is configured to transform the RFID integrated circuit to match that of free space (377 ohms). This is accomplished by the selection of the width and length of the antenna elements. RFID antenna are designed to operate between 860 MHz and 960 MHz. Conventional antenna may offer some rejection of RF signals at 2.45 GHz, but the attenuation provided, if at all, may not be sufficient to prevent the label from burning.

In accordance with the present technology, the RFID antenna is provided with tuning elements on the antenna segments. In one embodiment, the antenna is a dipole antenna having an open loop with antenna segments extending from the loop. The tuning elements are associated with the antenna segments. The tuning elements are provided as open circuit elements, which are added to both antenna segments of the dipole antenna. This has been found to provide another tuning element suitable for blocking or attenuating the incoming signal at frequencies greater than 2.45 GHz. The open circuit elements are provided in a shape and/or pattern to provide a desired level of attenuation to the unwanted signal.

FIGS. 1A-C show an embodiment of an RFID antenna 102 in accordance with the present technology. The RFID label 100 includes a folded dipole antenna 102. The folded dipole antenna 102 includes a loop region 103 having a first connection 104 and a second connection 106, each of which is connected to circuit chip 108. The folded dipole antenna includes dipole elements (antenna segments) 110 and 120 extending from the loop region in opposite directions from one another along a horizontal axis of the dipole antenna 102. The first dipole element 110 and second dipole element 120 in the embodiment of FIGS. 1A-C are provided as meandering dipole elements. The dipole elements 110 and 120 extend away from loop region 103 like arms along a horizontal axis 145 of the antenna 102 and are provided as an undulating pattern with wave-like elements. The overall pattern of antenna 102 forms a single dipole. In some embodiments, the dipole elements 110 and 120 can also have pads 130 and 140 at ends opposite of the loop region 103. When pads 130 and 140 are present, the first dipole element 110 extends from the loop region 103 through the first pad 130, and the second dipole element 120 extends from the loop region 103 through the second pad 140.

In one embodiment, the dipole elements 110 and 120 have the same length and pattern design. As shown in FIGS. 1*a-c*, the pattern for antenna segments 110 and 120 are provided as a square wave. The number of cycles, the period of the waves, the width of the wave segments, etc. can be selected to tune the antenna to operate in a predetermined operating frequency range. In an embodiment, the predetermined operating frequency range can be between 860 and 960 MHz. In another embodiment, the dipole elements 110 and 120 can have the same length but have different patterns. In still another embodiment, the dipole elements can differ from one another in length and/or in the pattern of the dipole element.

In an embodiment, the first dipole element 110 can extend from the loop region 103 and terminate at the first pad 130. Further, the second dipole element 120 can extend from the loop region 103 and terminate at the second pad 140.

In an embodiment, a physical length of the first dipole element 110 measured from the loop region 103 through the first pad 130 of the first dipole element 110 is shorter than an electrical length of the first dipole element 110, and a physical length of the second dipole element 120 measured from the loop region 103 through the second pad 140 of the second dipole element 120 is shorter than an electrical length of the second dipole element 120.

In an embodiment, the circuit chip 108 can be in electrical connection with the loop region 103 using a first connection 104 of the loop region 103 and a second connection 106 of the loop region 103, the first connection 104 and second connection 106 of the loop region 103 are located at a first side 112 of the loop region 103 and the first and second dipole elements 110 and 120 are electrically connected to a second side 114 of the loop region 103, The first side 112 and second side 114 of the loop region 103 are located on opposite sides of the loop region 103.

In another embodiment, the circuit chip 108 can be in electrical connection with the loop region 103 using the first connection 104 and second connection 106 of the loop region 103 located at the first side 112 of the loop region 103, and the first and second dipole elements 110 and 120 are electrically connected to the first side 112 of the loop region 103.

In a further embodiment, the circuit chip 108 can be in electrical connection with the loop region 102 using the first connection 104 and second connection 106 of the loop region 103 located at the first side 112 of the loop region 103, and the first and second dipole elements 110 and 120 are electrically connected at a location between the first side 112 and second side 114 of the loop region 103.

Therefore, it is contemplated that the circuit chip 108 and the first and second dipole elements 110 and 120 can be placed at any location of the loop region 103 that permits antenna 102 to form a single dipole.

The antenna 102 includes tuning elements 130*a* and 130*b* extending from a point along dipole elements 110 and 120, respectively. The tuning elements 130*a* and 130*b* are provided as open circuit patterns extending from the dipole elements 110 and 120. The tuning elements 130*a* and 130*b* have been found to provide attenuation of unwanted signals at frequencies of from about 2.4 to about 4.0 GHz. In embodiments, the tuning elements 130*a* and 130*b* can provide at least 35 dB of attenuation to unwanted signals at frequencies of from about 2.4 to 4.0 GHz. In embodiments, the tuning elements 130*a* and 130*b* can provide from about 0 dB to about 40 dB, about 5 dB to about 35 dB, about 10 dB to about 30 db, or about 15 dB to about 25 dB of attenuation for frequencies of from about 2.4 to about 4.0 GHz. In one embodiment, the tuning elements 130*a* and 130*b* provide from about 35 dB to about 40 dB of attenuation for frequencies of from about 2.4 to about 4.0 GHz.

The tuning elements 130*a* and 130*b* can be provided at any location along the length of either or both dipole element 110 or 120. The tuning elements 130*a* and 130*b* are provided by a conductive material connected to the dipole elements. In some embodiments, the length and/or shape of the tuning elements 130*a* and 130*b* is selected as desired to provide the desired level of attenuation of signal above 2.4 GHz In other embodiments, the length and/or shape of the tuning elements 130*a* and 130*b* is selected as desired to provide the desired level of attenuation of signal within the frequency band of 2.4 to 4.0 GHz. Additionally, the length or size of the shape of the tuning element 130*a* and 130*b* may vary depending on the location of the tuning element on the dipole element. In one embodiment, the tuning elements 130*a* and 130*b* are provided at equivalent positions on the respective dipole elements and have the same shape and size. In another embodiment, the tuning elements 130*a* and 130*b* are placed at different locations relative to one another on the respective dipole elements and may have the same or different shapes and be of different dimensions from one another. In an embodiment, the tuning elements 130*a* and 130*b* can have an "L" shape comprised of a short leg and a long leg. The short leg of the "L" shape being connected to the respective dipole elements 110 and 120, with the long leg extending perpendicularly away from the short leg.

In an embodiment, the shape and location of the tuning elements 130*a* and 130*b* can be provided to provide the desired level of attenuation of signal within the frequency band of 2.4 to 4.0 GHz. In an embodiment, the shape and location of the tuning elements 130*a* and 130*b* can be provided to provide the desired level of attenuation of signal above 2.4 GHz. The tuning elements 130*a* and 130*b* can have any shape as desired. The shape may be provided as a trace, a solid block element, or any other pattern. The tuning elements 130*a* and 130*b* could be provided as a geometric shape such as, but not limited to, a triangle, rectangle, circle, ellipse, trapezoid, pentagon, hexagon, and the like. In one embodiment, the size and/or length of the tuning element 130*a* and 130*b* can be decreased when it is positioned closer to the end of the dipole elements 110 and 120 (i.e., further away from the loop region 103 and closer to the pads 130 and 140).

The location, shape, and/or size of the tuning element 130*a* and 130*b* can be evaluated using electromagnetic simulation software. Constructing and testing of an antenna 102 is then performed to confirm that the antenna shape with tuning elements 130*a* and 130*b* provides the desired level of signal attenuation in the predetermined frequency range, such as the microwave range.

It will be appreciated that the antennas 102 shown in FIGS. 1A-C are merely illustrative embodiments of possible antenna 102. The shape and structure of the antenna 102, e.g., the configuration of the dipole elements with respect to the pattern, number of undulations, thickness of the regions, periodicity of the undulations, etc. can be selected as desired to provide a desired output within the region of 860 and 960 MHz, while also achieving the desired level of attenuation of signal above 2.4 GHz or in the frequency band of 2.4 to 4.0 GHz.

Materials chosen for RFID tags 100 of the present invention may be selected from a range of materials, with the choice being dependent on manufacturing cost, manufacturing yield, tag performance in its intended use, environmental factors (in addition to microwave radiation exposure), and similar considerations.

An RFID label 100 includes an antenna in accordance with the present technology formed on a substrate 101. The substrate 101 can be selected as desired for any particular purpose or intended application. Examples of suitable substrates include, but are not limited to, paper, cardboard, or polymer substrates such as, for example, polyester terephthalate (PET), polyimide, polyethylene, epoxy or reinforced epoxy, or similar materials.

The RFID antenna 102 may be formed from an electrically conductive material formed on the substrate in a pattern. The conductive pattern can be formed from any suitable material. Examples of suitable material includes, but is not limited to, copper, aluminum, silver, gold, other metals, or carbon. The antennas 102 may also be printed in conductive inks comprising dispersions of silver, gold, or other metals, or particles coated with silver, gold or other metallic conductors, or nonmetallic conductors such as carbon or polyaniline. The antennas 102 can be manufactured using commercially available flexible circuits that are produced using processes and designs of proven high yield. In general, the higher the conductivity of the antenna 102, the greater the current that will be produced in a coil of a particular size during microwave exposure. In general, the higher the conductivity of the antenna 102, the greater the read range of the RFID tag 100 for a coil of a particular size.

Embodiments described herein are applicable to all forms of labels. Labels 100 may also be referred to herein as tags. A "tag inlay" or "inlay" is defined as an assembled RFID device that generally includes an integrated circuit chip (and/or other electronic circuit) and antenna formed on a substrate, and is configured to respond to interrogations. A "tag label" or "label" is generally defined as an inlay that has been attached to a pressure sensitive adhesive 105 (PSA) construction, or has been laminated, and cut and stacked for application. In one embodiment, an inlay 100 is attached to another surface of article 150, or between surfaces of article 150, such as paper, cardboard, etc., for attachment to an article 150 to be tracked, such as an article of clothing, package of meat, etc.

The RFID tags 100 of the present invention may optionally be molded into or incorporated in various objects, containers, or housings, or the like.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

EXAMPLES

A RFID label 100 is provided that includes a RFID antenna 102 as shown in FIG. 1A. The RFID antenna 102 is formed from aluminum foil with a thickness of 9 μm on a 50 μm thick PET substrate. A comparative RFID label is prepared in a similar manner includes a RFID antenna having a shape similar to the antenna of FIG. 1A except that the comparative RFID antenna does not include the tuning elements 130*a* and 130*b*. (See FIG. 1B.)

Figure 2:
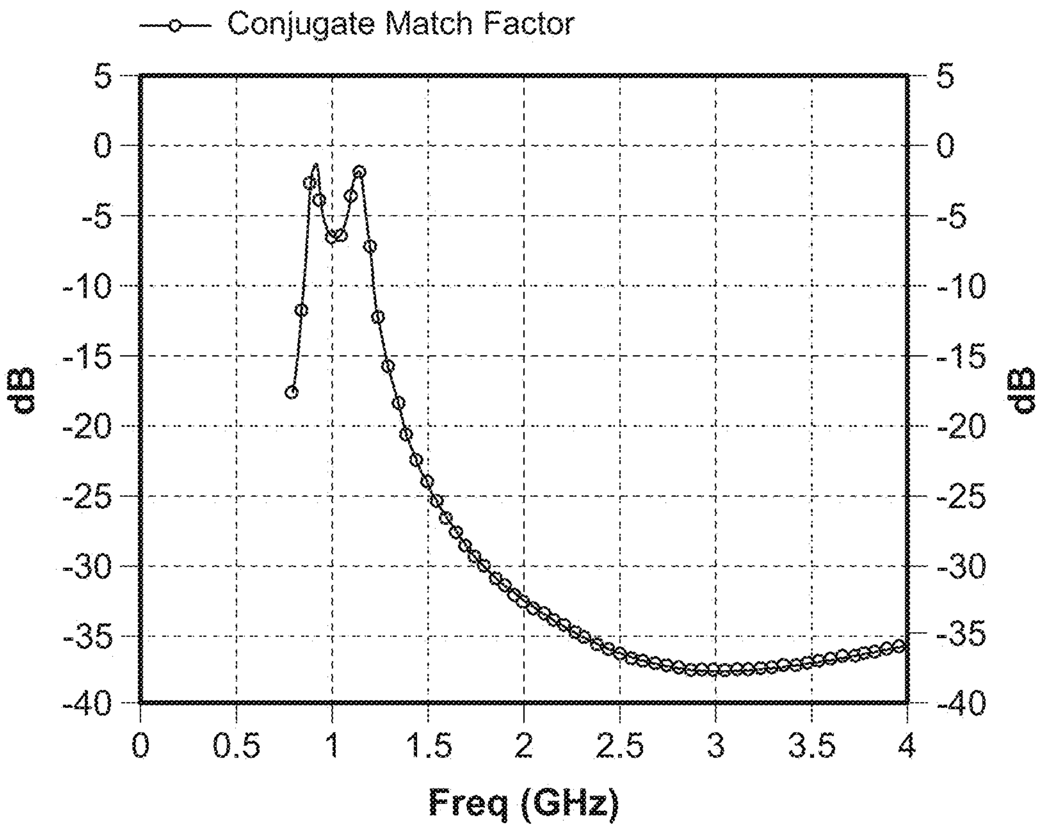
FIG. 2 is a conjugate match factor display for the comparative antenna of FIG. 1B.

The antennas 102 were analyzed using an electromagnetic simulator in free space. FIG. 2 shows a conjugate match factor display for the comparative antenna. The comparative antenna show match points at 911 MHz and 1,110 MHz indicating a good match between the antenna and free space. The comparative antenna also exhibits another region at 2.8 GHz where the antenna has only 10 dB of rejection to an incoming signal. When applied near a meat product, response illustrated in FIG. 2 shifts down in frequency by 50 to 200 MHz and the rejection at 2.45 GHz is reduced. Additionally, heat generated by the integrated circuit is sufficient to result in the label burning.

Figure 3:
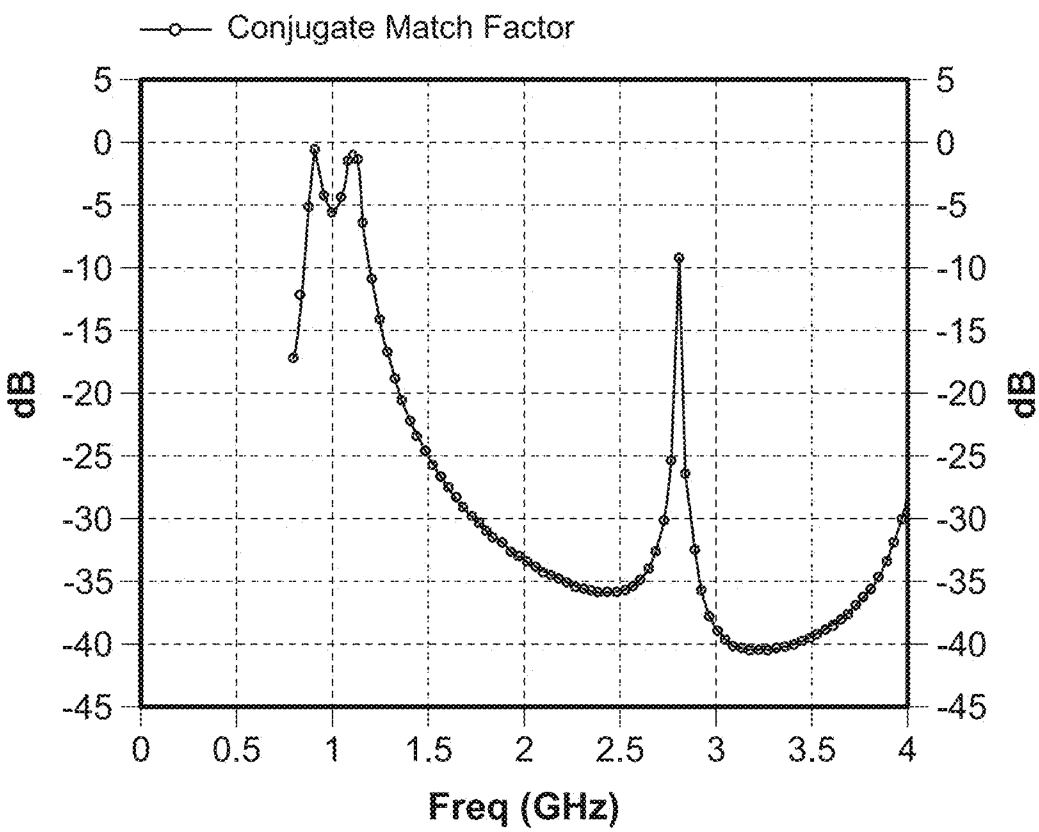
FIG. 3 is a conjugate match factor display for the RFID label of FIG. 1A.

FIG. 3 shows a conjugate match factor display for the antenna of FIG. 1A. The antenna shows match points in the range desired for RFID operation. FIG. 3 also shows greater than 35 dB of rejection of an incoming signal at a frequency of 2.4 GHz to 4 GHz. After adding the tuning elements, the original match points shifted lower in frequency. The height of the antenna loop region and the meandering dipole elements was reduced. This provided match points at 915 MHz and 1,130 MHz.

The foregoing description identifies various, non-limiting embodiments of a RFID label. Modifications may occur to those skilled in the art and to those who may make and use the invention. The disclosed embodiments are merely for illustrative purposes and not intended to limit the scope of the invention or the subject matter set forth in the claims.

What is claimed is:

1. A dipole antenna for a radio frequency identification label comprising:
- a loop region;
- a first dipole element in electrical connection with the loop region and terminating at a first pad;
- a second dipole element in electrical connection with the loop region and terminating at a second pad;
- the first and second dipole elements extending in opposite directions from each other another along a horizontal axis of the dipole antenna; and
- at least one tuning element, wherein the at least one tuning element extends from one or both of said first and second dipole elements, a shape, a size, and a location of each of the at least one tuning elements being selected to attenuate a signal at a frequency band of greater than 2 GHz.

2. The dipole antenna of claim 1, wherein an attenuation of signal in the frequency band greater than 2 GHz is at least 35 dB.

3. The dipole antenna of claim 1, wherein the at least one tuning element attenuates a signal between 2-14.5 GHz.

4. The dipole antenna of claim 1, wherein the at least one tuning element provides about 10 dB about 40 dB at a frequency band of between about 2.4 to about 4.0 GHz.

5. The dipole antenna of claim 1, wherein the at least one tuning element provides from about 35 dB to about 40 dB of desired attenuation for the predetermined frequency band of between about 2.4 to about 4.0 GHz.

6. The dipole antenna of claim 1, wherein the shape of the at least one tuning elements can a triangle, rectangle, circle, ellipse, trapezoid, pentagon, hexagon, "L", trace, or block; wherein the at least one tuning elements can all have the same shape, a different shape, or a combination of shapes.

7. The dipole antenna of claim 1, wherein the first and second dipole elements each have at least one tuning element of the same size at equivalent positions along the dipole elements, with each at least one tuning element extending therefrom having an "L" shape with a short leg and a long leg; the short legs of the "L" shape being electrically connected to the first and second dipole elements.

8. The dipole antenna of claim 1, wherein the first and second dipole elements each have a meandering pattern, wherein a physical length of the first dipole element is shorter than an electrical length of the first dipole element, and a physical length of the second dipole element is shorter than an electrical length of the second dipole element.

9. The dipole antenna of claim 1, further comprising a circuit chip in electrical connection with the loop region using a first connection of the loop region and a second connection of the loop region, wherein:
- the first connection and second connection of the loop region are located at a first side of the loop region and the first and second dipole elements are electrically connected to a second side of the loop region,
- the first connection and second connection of the loop region are located at the first side of the loop region and the first and second dipole elements are electrically connected to the first side of the loop region, or
- the first connection and second connection of the loop region are located at the first side of the loop region, and the first and second dipole elements are electrically connected at a location between the first side and second side of the loop region;
- wherein the first side and second side of the loop region are located on opposite sides of the loop region.

10. An radio frequency identification (RFID) label comprising:
- a dipole antenna formed on a substrate, the substrate having an adhesive for attaching the label to a surface;
- the dipole antenna having:
  - a loop region;
  - a first dipole element in electrical connection with the loop region and terminating at a first pad;
  - a second dipole element in electrical connection with the loop region and terminating at a second pad;
  - the first and second dipole elements extending in opposite directions from each other another along a horizontal axis of the dipole antenna; and
  - at least one tuning element, wherein the at least one tuning element extends from one or both of said first and second dipole elements, a shape, a size, and a location of each of the at least one tuning elements being selected to attenuate a signal at a frequency band of greater than 2 GHz.

11. The RFID label of claim 10, wherein the desired level of attenuation of signal is at least 35 dB.

12. The RFID label of claim 10, wherein the at least one tuning element attenuates a signal between 2-14.5 GHz.

13. The RFID label of claim 10, wherein the at least one tuning element provides about 10 dB to about 40 dB level of attenuation for the predetermined at a frequency band of between about 2.4 to about 4.0 GHz.

14. The RFID label of claim 10, wherein the at least one tuning element provides from about 35 dB to about 40 dB of desired attenuation for the predetermined frequency band of between about 2.4 to about 4.0 GHz.

15. The RFID label of claim 10, wherein the shape of the at least one tuning elements can a triangle, rectangle, circle, ellipse, trapezoid, pentagon, hexagon, "L", trace, or block; wherein the at least one tuning elements can all have the same shape, a different shape, or a combination of shapes.

16. The RFID label of claim 10, wherein the first and second dipole elements each have at least one tuning element of the same size at equivalent positions along the dipole elements, with each tuning element extending therefrom having an "L" shape with a short leg and a long leg; the short legs of the "L" shape being electrically connected to the first and second dipole elements.

17. The RFID label of claim 10, wherein the first and second dipole elements each have a meandering pattern, wherein a physical length of the first dipole element is shorter than an electrical length of the first dipole element, and a physical length of the second dipole element is shorter than an electrical length of the second dipole element.

18. The RFID label of claim 10, further comprising a circuit chip in electrical connection with the loop region using a first connection of the loop region and a second connection of the loop region, wherein:

the first connection and second connection of the loop region are located at a first side of the loop region and the first and second dipole elements are electrically connected to a second side of the loop region, the first connection and second connection of the loop region are located at the first side of the loop region and the first and second dipole elements are electrically connected to the first side of the loop region, or the first connection and second connection of the loop region are located at the first side of the loop region, and the first and second dipole elements are electrically connected at a location between the first side and second side of the loop region;

wherein the first side and second side of the loop region are located on opposite sides of the loop region.

19. An article comprising:

an article and a radio frequency identification (RFID) label attached to the article;

the RFID label comprising:

a dipole antenna formed on a substrate, the substrate having an adhesive for attaching the label to a surface; the dipole antenna having:

a loop region;

a first dipole element in electrical connection with the loop region and terminating at a first pad;

a second dipole element in electrical connection with the loop region and terminating at a second pad;

the first and second dipole elements extending in opposite directions from each other another along a horizontal axis of the dipole antenna; and at least one tuning element, wherein the at least one tuning element extends from one or both of said first and second dipole elements, a shape, a size, and a location of each of the at least one tuning elements being selected to attenuate a signal at a frequency band of greater than 2 GHz;

wherein the desired level of attenuation is selected to prevent the RFID label from thermally damaging the article, when the RFID label is exposed to RF energy in excess of a predetermined power level within the predetermined frequency band.

20. The article of claim 19, wherein the predetermined power level is greater than +20 dB.

* * * * *